B. S. Roberts,
Breech Loader.
No 3952.
Reissued May 31 1870.
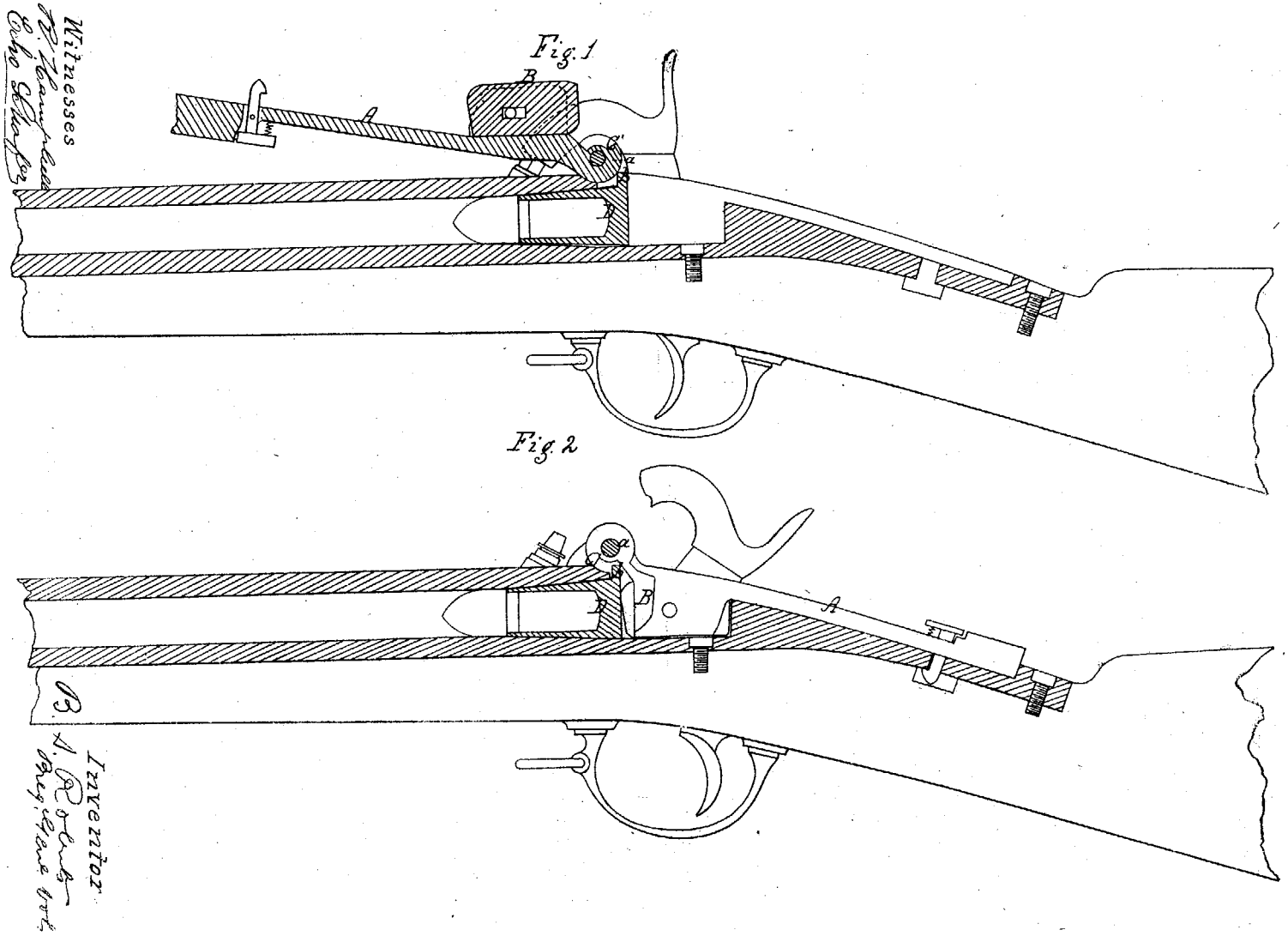
Witnesses
H. Hamphell
Echo Schafer
Inventor
B. S. Roberts
Reg. 4th Ind. Vol.

UNITED STATES PATENT OFFICE.

BENJAMIN S. ROBERTS, OF THE UNITED STATES ARMY.

IMPROVEMENT IN BREECH-LOADING FIRE-ARMS.

Specification forming part of Letters Patent No. 36,531, dated September 23, 1862; Reissue No. 2,067, dated September 5, 1865; Reissue No. 3,952, dated May 3, 1870.

DIVISION 2.

*To all whom it may concern:*

Be it known that I, BENJAMIN S. ROBERTS, of the United States Army, have invented a new and useful Improvement in Breech-Loading Fire-Arms; and I do hereby declare that the following is a full and exact description thereof, reference being had to the accompanying drawings, in which—

Figure 1 is a central longitudinal section of a breech-loading fire-arm embodying my invention, with its cartridge as it appears when the cartridge is driven home and the gun is closed, ready for firing. Fig. 2 is a similar view of the same arm as it appears when the gun has been opened after firing and the cartridge-shell is started from its seat in the barrel and partially withdrawn.

My invention relates to that class of breech-loading fire-arms in which it is intended to use cartridges having a case designed to be extracted and removed from the barrel after firing, and which are provided with a movable breech-piece for closing the breech of the gun.

It consists in such a location and arrangement of the breech-piece, its lever, and breech of the barrel with reference to each other that a spur or tooth, or its equivalent, on the hinge end of the lever breech-piece shall, when the latter is swung up and forward in the act of opening the breech of the gun, engage with the cartridge-case and remove or start it from its seat in the barrel.

To enable others skilled in the art to make and use my invention, I will proceed to describe one form of a gun embodying it.

A represents the lever breech-piece, which is provided with a sliding plug, B. This lever breech-piece is attached to the breech of the barrel by means of the hinge O. B is its sliding plug. This plug slides between the jaws B′, which project from the under side of the lever breech-piece A, and is held thereto by means of the pins *b*, which slide in the slots *c* of said jaws, thereby securing to the plug a direct forward and backward movement. D is a metallic cartridge-case constructed with a flange or projection, *h*.

The operation of my invention is as follows: The breech of the gun being open, the cartridge D is introduced into the breech of the barrel and the lever breech-piece A swung back and down into position. In doing this, the sliding plug B, in passing into its seat, is pressed forward between the jaws B′ by the shoulder E, thereby pressing the cartridge D home into its seat in the breech of the barrel, and its flange or projection *h* up against the spur *c*, which is formed in the end of the lever breech-piece A by cutting away part of its hinge. After the gun has been discharged the breech is again opened by swinging the lever breech-piece A up and forward over the barrel of the gun and on a line with it, in doing which the spur *c* on the end of the lever breech-piece engages with the flange or projection *h* of the shell D, and thereby draws the shell back out of the breech of the barrel, the sliding plug B being slid back in its jaws B′ by the same movement.

It is not essential that the precise arrangement of the several parts above described and represented should be employed in order to embody the spirit of my invention.

What I claim as my invention, and desire to secure by Letters Patent, is—

The breech and lever breech-piece A, with its sliding plug B, when arranged and located in relation to each other in a breech-loading fire-arm, as herein described, or in any equivalent manner, so that a hook or tooth, or its equivalent, formed on one end of the lever breech-piece, shall, while the latter is moving in the act of opening the breech, engage with the cartridge-case and remove or start it from its seat in the barrel, substantially as described.

B. S. ROBERTS.

Witnesses:
L. SPERRY,
S. S. PIERPONT.